(12) United States Patent
Oda (10) Patent No.: US 11,236,655 B2
(45) Date of Patent: Feb. 1, 2022

(54) CONTROL DEVICE FOR INTERNAL COMBUSTION ENGINE

(71) Applicant: TOYOTA JIDOSHA KABUSHIKI KAISHA, Aichi-ken (JP)

(72) Inventor: Tomihisa Oda, Numazu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/182,068

(22) Filed: Feb. 22, 2021

(65) Prior Publication Data

US 2021/0301697 A1 Sep. 30, 2021

(30) Foreign Application Priority Data

Mar. 25, 2020 (JP) .............................. JP2020-054648

(51) Int. Cl.
*F01N 3/08* (2006.01)
*F01N 9/00* (2006.01)

(52) U.S. Cl.
CPC ......... *F01N 3/0878* (2013.01); *F01N 3/0814* (2013.01); *F01N 3/0835* (2013.01); *F01N 3/0892* (2013.01); *F01N 9/00* (2013.01); *F01N 2240/16* (2013.01); *F01N 2250/12* (2013.01); *F01N 2390/02* (2013.01); *F01N 2570/12* (2013.01); *F01N 2900/1602* (2013.01)

(58) Field of Classification Search
CPC .... F01N 3/0878; F01N 3/0814; F01N 3/0892; F01N 9/00; F01N 3/0835; F01N 2390/02; F01N 2250/12; F01N 2900/1602; F01N 2240/16; F01N 2570/12
See application file for complete search history.

(56) References Cited

U.S. PATENT DOCUMENTS

| | | | | |
|---|---|---|---|---|
| 5,738,832 A | * | 4/1998 | Dogahara | .......... B01D 53/9481 422/171 |
| 6,253,547 B1 | * | 7/2001 | Watanabe | ............. F01N 13/009 60/297 |
| 6,397,586 B1 | * | 6/2002 | Sakurai | ............. B01D 53/9495 60/285 |
| 2010/0319327 A1 | * | 12/2010 | Sano | ..................... B60W 10/06 60/286 |

FOREIGN PATENT DOCUMENTS

| | | |
|---|---|---|
| JP | 2001295633 A | 10/2001 |
| JP | 2005299400 A | 10/2005 |

* cited by examiner

*Primary Examiner* — Brandon D Lee
(74) *Attorney, Agent, or Firm* — Hauptman Ham, LLP (57) ABSTRACT

An exhaust passage includes a main passage and bypass passage, a catalyst, an exhaust control valve, and an HC adsorbent in the bypass passage. The exhaust control valve is controlled so that, when a temperature of the catalyst is higher than a predetermined sintering occurrence temperature, the quality of HC desorbed from the HC adsorbent is greater when the air-fuel ratio of the exhaust gas flowing through the upstream exhaust passage portion is a lean air-fuel ratio compared to when it is a stoichiometric air-fuel ratio or rich air-fuel ratio, or the quality of HC desorbed from the HC adsorbent is greater when the air-fuel ratio of the exhaust gas flowing through the upstream exhaust passage portion is a larger lean air-fuel ratio compared to when it is a smaller lean air-fuel ratio.

8 Claims, 8 Drawing Sheets

CONTROL DEVICE FOR INTERNAL COMBUSTION ENGINE

RELATED APPLICATIONS

The present application claims priority of Japanese Patent Application No. 2020-054648 filed Mar. 25, 2020, the disclosure of which is hereby incorporated by reference herein in its entirety.

FIELD

The present disclosure relates to a control device for an internal combustion engine.

BACKGROUND

An internal combustion engine is known in the art that is provided with an exhaust passage comprised of an upstream exhaust passage portion connected to an engine body, a downstream exhaust passage portion, and a main exhaust passage portion and bypass exhaust passage portion extending alongside each other between the upstream exhaust passage portion and the downstream exhaust passage portion, a catalyst arranged in the downstream exhaust passage portion, an exhaust control valve for distributing the exhaust gas flowed through the upstream exhaust passage portion to the main exhaust passage portion and bypass exhaust passage portion, and an HC adsorbent arranged in the bypass exhaust passage portion and configured to adsorb HC (hydrocarbons) in the exhaust gas (for example, see Japanese Unexamined Patent Publication No. 2001-295633) therein.

In Japanese Unexamined Patent Publication No. 2001-295633, when the temperature of the catalyst is low and therefore the catalyst is in an inactive state, the exhaust control valve is controlled so as to close the main exhaust passage portion. As a result, exhaust gas is introduced to the HC adsorbent and the HC in the exhaust gas is adsorbed in the HC adsorbent. Therefore, a large amount of HC is limited from passing through the catalyst in the inactive state. Further, in Japanese Unexamined Patent Publication No. 2001-295633, when the catalyst is in an activated state, the exhaust control valve is controlled so as to close the bypass exhaust passage portion. As a result, exhaust gas flows through the main exhaust passage portion and reaches the catalyst and the HC in the exhaust gas is removed by the catalyst in the activated state.

On the other hand, when operation of an internal combustion engine should be started, in general, motoring is executed in which a crankshaft is turned by an electric motor. In this motoring, first driving of the crankshaft by the electric motor is performed without performing fuel injection. Next, for example if cylinder discrimination is completed, fuel injection is started, therefore driving of the crankshaft by the electric motor is performed while fuel injection is performed. Next, for example if the engine rotational speed becomes higher, it is judged that the engine startup has finished and driving of the crankshaft by the electric motor, that is, motoring is stopped. In this way, in motoring, first motoring without fuel injection is performed, then motoring with fuel injection is performed.

SUMMARY

While motoring without fuel injection is being performed, oxygen rich exhaust gas is discharged from the engine body. This oxygen rich exhaust gas flows through the upstream exhaust passage portion. That is, the air-fuel ratio of the exhaust gas flowing through the upstream exhaust passage portion is a lean air-fuel ratio. Therefore, if at this time, the exhaust control valve is controlled so as to open the main exhaust passage portion, this oxygen rich exhaust gas flows into the catalyst and the catalyst becomes an oxidizing atmosphere. Furthermore, at this time, if the temperature of the catalyst is considerably high (for example, 550° C. or more), that is, if the catalyst is hot and in an oxidizing atmosphere, sintering may occur in the catalyst, in which the particles of the catalyst agglomerate. If sintering occurs, the surface area of the catalyst particles is decreased and exhaust purification ability of the catalyst may fall. In other words, if the exhaust control valve is controlled so as to open the main exhaust passage portion due to that the catalyst is activated and in that state motoring without fuel injection is performed, sintering may occur at the catalyst when the temperature of the catalyst is considerably high. This problem may occur in other cases where the air-fuel ratio of the exhaust gas flowing through the upstream exhaust passage portion is the lean air-fuel ratio, for example, at the time of a fuel cut operation.

According to a first aspect of the present disclosure, a control device for an internal combustion engine comprises: an exhaust passage, a catalyst, an exhaust control valve, an HC adsorbent, and an electronic control unit. The exhaust passage is provided with: an upstream exhaust passage portion connected with an engine body; a downstream exhaust passage portion; and a main exhaust passage portion and bypass exhaust passage portion extending alongside each other between the upstream exhaust passage portion and the downstream exhaust passage portion. The catalyst is arranged in the downstream exhaust passage portion. The exhaust control valve distributes exhaust gas flowed through the upstream exhaust passage portion to the main exhaust passage portion or the bypass exhaust passage portion to control a main exhaust gas quantity which is an amount of exhaust gas flowing through the main exhaust passage portion and a bypass exhaust gas quantity which is an amount of exhaust gas flowing through the bypass exhaust passage portion. The HC adsorbent is arranged in the bypass exhaust passage portion and configured to adsorb HC in the exhaust gas. The electronic control unit is configured to control the exhaust control valve, when it is judged that the temperature of the catalyst is higher than a sintering occurrence temperature determined in advance, so that the quantity of HC desorbed from the HC adsorbent is greater when it is judged that an air-fuel ratio of the exhaust gas flowing through the upstream exhaust passage portion is a lean air-fuel ratio compared to when it is judged that the air-fuel ratio of the exhaust gas flowing through the upstream exhaust passage portion is a stoichiometric air-fuel ratio or rich air-fuel ratio, or so that the quantity of HC desorbed from the HC adsorbent is greater when it is judged that the air-fuel ratio of the exhaust gas flowing through the upstream exhaust passage portion is a larger lean air-fuel ratio compared to when it is judged that the air-fuel ratio of the exhaust gas flowing through the upstream exhaust passage portion is a smaller lean air-fuel ratio.

According to a second aspect of the present disclosure, the electronic control unit is configured to control the exhaust control valve, when it is judged that the temperature of the catalyst is higher than the sintering occurrence temperature, so that the quantity of HC desorbed from the HC adsorbent is greater when motoring without fuel injection is performed compared with when motoring without fuel injection is not performed.

According to a third aspect of the present disclosure, the electronic control unit is configured to control the exhaust control valve, when it is judged that the temperature of the catalyst is higher than the sintering occurrence temperature, so that the main exhaust passage portion is closed when motoring without fuel injection is not performed and so that the main exhaust passage portion is opened when motoring without fuel injection is not performed.

According to a fourth aspect of the present disclosure, the electronic control unit is configured to control the exhaust control valve, when it is judged that the temperature of the catalyst is higher than the sintering occurrence temperature, so that the quantity of HC desorbed from the HC adsorbent is greater when a fuel cut operation is performed compared with when a fuel cut operation is not performed.

According to a fifth aspect of the present disclosure, the electronic control unit is configured to control the exhaust control valve, when it is judged that the temperature of the catalyst is higher than the sintering occurrence temperature, so that the main exhaust passage portion is closed when a fuel cut operation is performed and so that the main exhaust passage portion is opened when a fuel cut operation is not performed.

According to a sixth aspect of the present disclosure, the electronic control unit is configured to control the exhaust control valve, when it is judged that the temperature of the catalyst is higher than the sintering occurrence temperature, so that the quantity of HC desorbed from the HC adsorbent is greater when it is judged that the air-fuel ratio of the exhaust gas flowing through the upstream exhaust passage portion is larger than a set lean air-fuel ratio determined in advance compared with when the air-fuel ratio of the exhaust gas flowing through the upstream exhaust passage portion is smaller than the set lean air-fuel ratio.

According to a seventh aspect of the present disclosure, the electronic control unit is configured to control the exhaust control valve, when it is judged that the temperature of the catalyst is higher than the sintering occurrence temperature, so that the main exhaust passage portion is closed when it is judged that the air-fuel ratio of the exhaust gas flowing through the upstream exhaust passage portion is larger than a set lean air-fuel ratio determined in advance and so that the main exhaust passage portion is opened when it is judged that the air-fuel ratio of the exhaust gas flowing through the upstream exhaust passage portion is smaller than the set lean air-fuel ratio.

According to an eighth aspect of the present disclosure, an electric heater is configured to directly or indirectly heat the HC adsorbent. The electronic control unit is configured to actuate the electric heater if it is judged that the temperature of an upstream exhaust member, which forms the upstream exhaust passage portion, is lower than a predetermined threshold value, when it is judged that the temperature of the catalyst is higher than the sintering occurrence temperature and the exhaust control valve is controlled so that the main exhaust passage portion is closed.

According to a ninth aspect of the present disclosure, the electronic control unit is configured to control the exhaust control valve so that the main exhaust passage portion is closed when it is judged that the catalyst is in an inactive state.

It is possible to limit the exhaust purification ability of the catalyst from falling.

DESCRIPTION OF EMBODIMENTS

Figure 1:
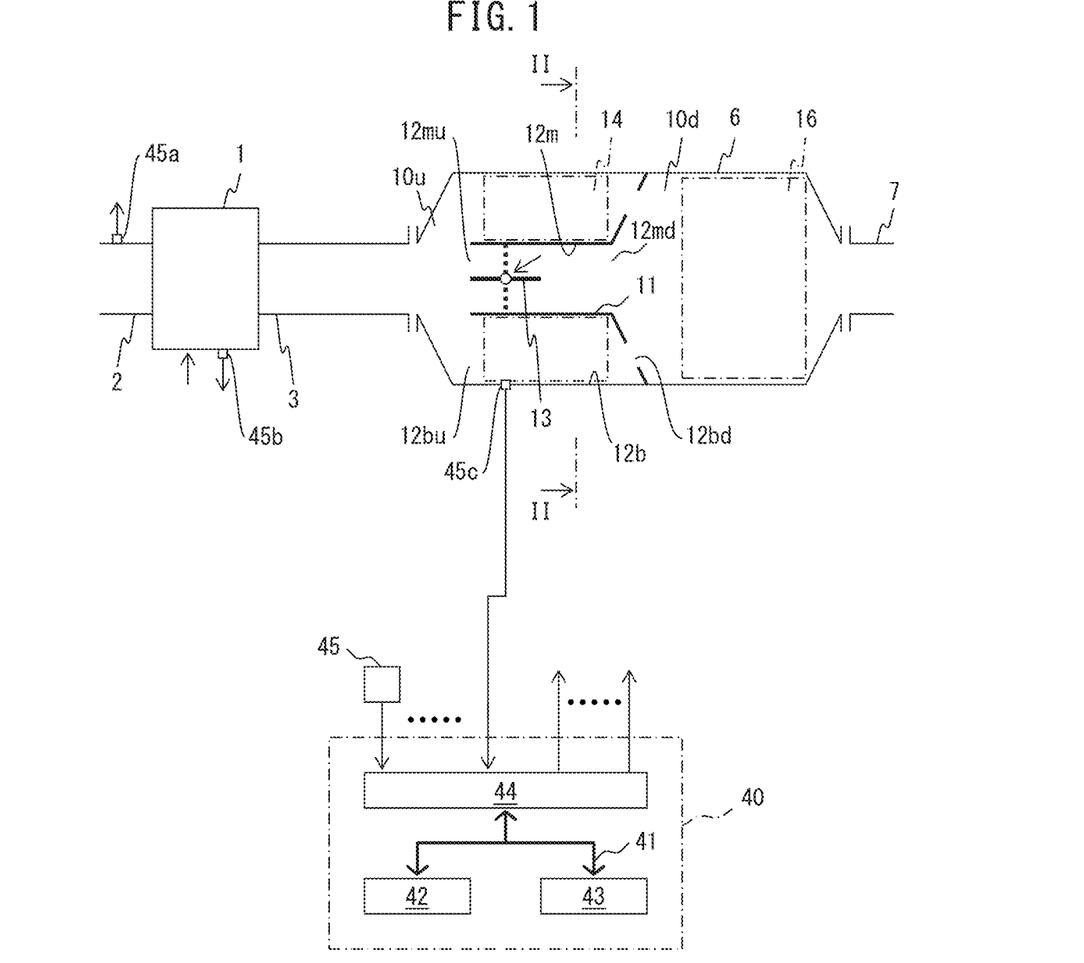
FIG. 1 is a schematic overall view of an internal combustion engine in an embodiment according to the present disclosure.

Referring to FIG. 1, 1 indicates an internal combustion engine body, 2 an intake pipe connected to the engine body 1, and 3 an exhaust pipe connected to the engine body 1. In an embodiment according to the present disclosure, the exhaust pipe 3 is connected to a casing 6 while the casing 6 is connected to an exhaust pipe 7.

On the other hand, at one end in the longitudinal direction of the casing 6 in an embodiment according to the present disclosure, an upstream space 10u is formed extending over the entire radial direction of the casing 6. Further, at the other end in the longitudinal direction of the casing 6 of an embodiment according to the present disclosure, a downstream space 10d is formed extending over the entire radial direction of the casing 6. At the upstream space 10u, the above-mentioned exhaust pipe 3 is connected, while at the downstream space 10d, the exhaust pipe 7 is connected. Furthermore, between the upstream space 10u and the downstream space 10d, a main passage 12m and a bypass passage 12b are defined by a partition wall 11. The main passage 12m of an embodiment according to the present disclosure is positioned at the center of the casing 6 in the radial direction and forms a tubular shape. Further, the bypass passage 12b of an embodiment according to the present disclosure is positioned at the surroundings of the main passage 12m and forms an annular shape. An upstream end 12mu of the main passage 12m and an upstream end 12bu of the bypass passage 12b are connected respectively to the upstream space 10u, while a downstream end 12md of the main passage 12m and a downstream end 12bd of the bypass passage 12b are connected with the downstream space 10d. Therefore, the main passage 12m and bypass passage 12b of an embodiment according to the present disclosure extend alongside or parallel to each other, between the upstream space 10u and the downstream space 10d. Note that, the partition wall 11 of an embodiment according to the present disclosure is provided with a portion flaring outward in the radial direction of the casing 6 toward the downstream space 10d. The downstream end 12bd of the bypass passage 12b is formed in the shape of an opening formed in this flared portion.

In an embodiment according to the present disclosure, an exhaust control valve 13 is provided for distributing the exhaust gas flowed through the upstream space 10u to the main passage 12m and bypass passage 12b to control a main exhaust gas quantity, which is a quantity of exhaust gas flowing through the main passage 12m, and a bypass exhaust gas quantity, which is a quantity of exhaust gas flowing through the bypass passage 12b. If an opening degree position of the exhaust control valve 13 is controlled to a closed position shown by the broken line in FIG. 1, the main passage 12m is closed. Therefore, substantially all of the exhaust gas flows through the bypass passage 12b. As opposed to this, if the opening degree position of the exhaust control valve 13 is controlled to an opened position shown by the solid line in FIG. 1, the main passage 12m is opened. Therefore, the major portion of the exhaust gas flows through the main passage 12m and a small quantity of exhaust gas flows through the bypass passage 12b. Further, if the opening degree position of the exhaust control valve 13 is made to approach the above-mentioned closed position, the main exhaust gas quantity is decreased and the bypass exhaust gas quantity is increased. As opposed to this, if the opening degree position of the exhaust control valve 13 is made to approach the opened position shown by the solid line of FIG. 1, the bypass exhaust gas quantity is decreased and the main exhaust gas quantity is increased. Note that, in an embodiment according to the present disclosure, when the main passage 12m is opened, the quantity and direction of the exhaust gas flowing through the bypass passage 12b fluctuate in accordance with, for example, an amount of exhaust gas flowing through the exhaust passage. Here, in an embodiment according to the present disclosure, the quantity of exhaust gas flowing through the exhaust passage is expressed by the quantity of intake air. In another embodiment (not shown) where secondary air is supplied to the exhaust passage upstream of the casing 6, the quantity of exhaust gas flowing through the exhaust passage is expressed by the total of the quantity of intake air and the quantity of secondary air. In a further other embodiment (not shown), if the opening degree position of the exhaust control valve 13 is controlled to the opened position shown by the solid line in FIG. 1, substantially all of the exhaust gas flows through the main passage 12m.

Figure 2:
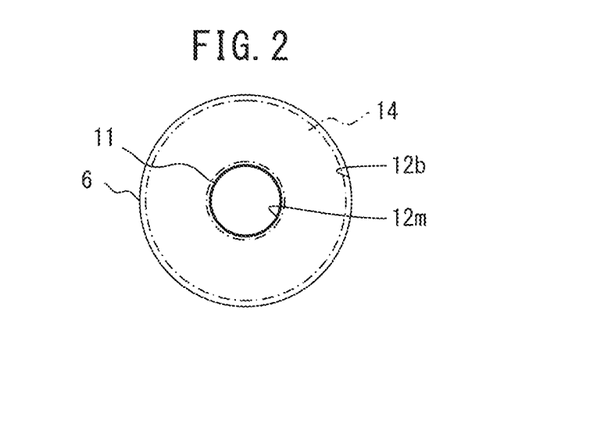
FIG. 2 is a schematic cross-sectional view of a casing seen along the line II-II of FIG. 1.

As shown in FIG. 1 and FIG. 2, inside of the bypass passage 12b of an embodiment according to the present disclosure, an HC adsorbent 14 is housed for adsorbing HC (hydrocarbons) contained in the exhaust gas therein. On the other hand, inside of the downstream space 10d of the casing 6 of an embodiment according to the present disclosure, a relatively large volume catalyst 16 is housed. The catalyst 16 is comprised of for example a three way catalyst or oxidation catalyst.

Therefore, the exhaust passage of an embodiment according to the present disclosure is provided with an upstream exhaust passage portion connected to the engine body, a downstream exhaust passage portion, and a main exhaust passage portion and a bypass exhaust passage portion extending alongside each other between the upstream exhaust passage portion and downstream exhaust passage portion. In this case, the upstream exhaust passage portion includes at least the upstream space 10u. Further, the downstream exhaust passage portion includes at least the downstream space 10d. The upstream exhaust passage portion of the example shown in FIG. 1 includes the inside space of the exhaust pipe 3 in addition to the upstream space 10u. Further, the downstream exhaust passage portion of the example shown in FIG. 1 includes the inside space of the exhaust pipe 7 in addition to the downstream space 10d. On the other hand, the main exhaust passage portion includes at least the main passage 12m. The bypass exhaust passage portion includes at least the bypass passage 12b.

An electronic control unit 40 of an embodiment according to the present disclosure is provided with components communicably connected by a bidirectional bus 41 with each other such as one or more processors 42, one or more memories 43, and an input/output port 44. The memories 43 store various programs. These programs are run by the processors 42 whereby various routines are executed. At the input/output port 44, one or more sensors 45 are communicably connected with each other. The sensors 45 of an embodiment according to the present disclosure include, for example, an air flow meter 45a attached to the intake pipe 2 and detecting the quantity of intake air, a water temperature sensor 45b for detecting the engine cooling water temperature, a temperature sensor 45c for detecting the temperature of the HC adsorbent 14, a depression sensor for detecting the amount of depression of an accelerator pedal showing the engine load, a crank angle sensor for detecting a crank angle of the engine body 1, an air-fuel ratio for detecting the air-fuel ratio, an air temperature sensor for detecting an air temperature, a temperature sensor for detecting the temperature of the catalyst 16, a temperature sensor for detecting the temperature of the exhaust pipe 3, an air-fuel ratio sensor for detecting the air-fuel ratio of the exhaust gas at the upstream space 10u, an air-fuel ratio sensor for detecting the air-fuel ratio of the exhaust gas in the downstream space 10d, etc. At the processor 42 of an embodiment according to the present disclosure, for example, the engine rotational speed is calculated based on the output of the crank angle sensor and the cylinders are discriminated or the crank angle is identified. On the other hand, the input/output port 44 is communicably connected with the engine body 1 (throttle valve, fuel injectors, spark plugs, etc.), exhaust control valve 13, etc. The exhaust control valve 13 etc. are controlled based on signals from the electronic control unit 40.

The internal combustion engine of an embodiment according to the present disclosure is used as an internal combustion engine of a hybrid vehicle, for example. The hybrid vehicle is provided with an electric motor and internal combustion engine and can switch the operating mode between an EV mode and an HV mode. In the EV mode, an operation of the internal combustion engine is stopped while the electric motor is operated. In this case, the output of the electric motor is transmitted to an axle. On the other hand, in the HV mode, the electric motor and internal combustion engine are operated. In this case, in one example, the output of the electric motor and the output of the internal combustion engine are transmitted to the axle. In another example, the output of the electric motor is transmitted to the axle while the output of the internal combustion engine is transmitted to a generator. The electric power generated at the generator is sent to the electric motor.

When the operating mode should be switched from the EV mode to the HV mode, operation of the internal combustion engine is started. As opposed to this, when the operating mode should be switched from the HV mode to the EV mode, an operation of the internal combustion engine is stopped. Therefore, in a hybrid vehicle, execution of the engine operation and stoppage of the engine operation may be repeated while the vehicle operation is continued. Note that, the operating mode, for example, is switched based on a required output of the vehicle, an SOC (state of charge) of a battery (not shown), etc.

Now then, in an embodiment according to the present disclosure, when it is judged that the catalyst 16 is in an inactive state, such as at the time of cold start, that is, when it is judged that the temperature of the catalyst 16 is lower than an activation temperature (for example, 350° C.), the exhaust control valve 13 is positioned at the closed position (dotted line of FIG. 1) and thus the main passage 12m is closed. As a result, the exhaust gas is guided to the HC adsorbent 14. At this time, the temperature of the HC adsorbent 14 is also low, so the HC in the exhaust gas is adsorbed in the HC adsorbent 14. As a result, a large quantity of HC is limited from being discharged into the atmosphere. Note that, in an embodiment according to the present disclosure, whether the catalyst 16 is in an activated state is judged based on, for example, the time elapsed from when engine operation is started, the temperature of the engine cooling water, the temperature of the atmosphere, etc. or is judged based on the temperature of the catalyst 16 detected by the temperature sensor.

As opposed to this, when it is judged that the catalyst 16 is in an activated state, the exhaust control valve 13 is positioned at the opened position (solid line of FIG. 1) and thus the main passage 12m is opened. As a result, exhaust gas flows mainly through the main passage 12m. The HC in the exhaust gas at this time is oxidized well by the catalyst 16. Therefore, in this case as well, a large quantity of HC is limited from being discharged into the atmosphere.

On the other hand, under a condition where the HC is adsorbed in the HC adsorbent 14, if the exhaust gas flows through the HC adsorbent 14 or bypass passage 12b and thereby the temperature of the HC adsorbent 14 becomes higher than an HC desorption temperature (for example, 200° C.), FTC is desorbed from the HC adsorbent 14, then flows into the catalyst 16. In this case, the quantity of HC desorbed from the HC adsorbent 14 is larger when the quantity of exhaust gas flowing through the HC adsorbent 14 is large, compared with when the quantity of exhaust gas flowing through the HC adsorbent 14 is small. That is, the quantity of HC desorbed from the HC adsorbent 14 when the quantity of exhaust gas flowing through the HC adsorbent 14 is large is larger than that when the quantity of exhaust gas flowing through the HC adsorbent 14 is small. Therefore, when the exhaust control valve 13 is in the closed position, the quantity of HC desorbed from the HC adsorbent 14 is greater compared to when the exhaust control valve 13 is in the opened position.

In this regard, in an embodiment according to the present disclosure, when operation of the internal combustion engine should be started, motoring is executed in which the crankshaft is turned by an electric motor (not shown). In this motoring, first, driving of the crankshaft is performed by the electric motor without performing fuel injection. Next, if, for example, discrimination of the cylinder or identification of the crank angle is completed, fuel injection is started. Therefore, driving of the crankshaft by the electric motor is performed while fuel injection is performed. Next, for example, if the engine rotational speed exceeds a predetermined rotational speed, it is judged that the engine startup is completed and driving of the crankshaft by the electric motor, that is, motoring, is stopped. In this way, in motoring, first, motoring without fuel injection is performed. Next, fuel injection with fuel injection is performed.

While motoring without fuel injection is being performed, oxygen rich exhaust gas is discharged from the engine body 1. This oxygen rich exhaust gas flows through the exhaust pipe 3 and the upstream space 10u. In other words, the air-fuel ratio of the exhaust gas flowing through the exhaust pipe 3, for example is the lean air-fuel ratio. Therefore, if at this time, the exhaust control valve 13 is controlled to the opened position and the main passage 12m is opened, this oxygen rich exhaust gas flows into the catalyst 16 and thus the catalyst 16 becomes an oxidizing atmosphere. Furthermore, if at this time the temperature of the catalyst 16 is higher than a sintering occurrence temperature (for example, 550° C.), that is, if the catalyst 16 is hot and in an oxidizing atmosphere, sintering may occur at the catalyst 16. That is, the exhaust purification ability of the catalyst 16 may fall.

In other words, if the exhaust control valve 13 is controlled to the opened position to open the main passage 12m due to the catalyst 16 being activated and motoring without fuel injection is performed in this state, sintering may occur at the catalyst 16 when the temperature of the catalyst 16 is considerably high. Note that, for example, while the engine is stopped after engine high load operation is continued, the temperature of the catalyst 16 may exceed the sintering occurrence temperature.

Therefore, in an embodiment according to the present disclosure, when it is judged that the temperature of the catalyst 16 is higher than a predetermined, set temperature (for example, 500° C.), at the time of performing motoring without fuel injection, the exhaust control valve 13 is controlled to the closed position to close the main passage 12m. As a result, the quantity of exhaust gas flowing through the HC adsorbent 14 is increased.

It is considered that when it is judged that the temperature of the catalyst 16 is higher than the set temperature, the temperature of the HC adsorbent 14 is higher than the HC desorption temperature (for example, 200° C.). Therefore, at this time, HC is reliably desorbed from the HC adsorbent 14. Further, it is considered that when it is judged that the temperature of the catalyst 16 is high, the temperature of an upstream exhaust member, which forms the above-mentioned upstream exhaust passage portion, is also high. In an embodiment according to the present disclosure, the upstream exhaust passage portion includes the inside space of the exhaust pipe 3 and the upstream space 10u, is also high. As a result, the exhaust gas is heated by the upstream exhaust member, and then flows into the HC adsorbent 14 and heats the HC adsorbent 14. Therefore, on this point as well, HC is reliably desorbed from the HC adsorbent 14.

As explained above, in an embodiment according to the present disclosure, when performing motoring without fuel injection, the quantity of exhaust gas flowing through the HC adsorbent 14 is increased. Therefore, when performing motoring without fuel injection, the quantity of HC desorbed from the HC adsorbent 14 is increased.

The HC desorbed from the HC adsorbent 14 next flows into the catalyst 16. As a result, the air-fuel ratio of the exhaust gas flowing into the catalyst 16 or the concentration of oxygen in the exhaust gas falls. Alternatively, the catalyst 16 is limited from becoming an oxidizing atmosphere. Therefore, sintering is limited from occurring at the catalyst 16. In this case, the air-fuel ratio of the exhaust gas flowing into the catalyst 16 is preferably made the stoichiometric air-fuel ratio or rich air-fuel ratio and is more preferably made the stoichiometric air-fuel ratio. Note that, the HC desorbed from the HC adsorbent 14 is removed well at the catalyst 16. Further, the set temperature in an embodiment according to the present disclosure is set lower than the sintering occurrence temperature mentioned above and is set higher than the activation temperature of the catalyst 16.

As opposed to this, in an embodiment according to the present disclosure, when not performing motoring without fuel injection, the exhaust control valve 13 is controlled to the opened position to open the main passage 12m. In an embodiment according to the present disclosure, at this time, the air-fuel ratio of the exhaust gas flowing through the upstream space 10u is the stoichiometric air-fuel ratio or rich air-fuel ratio. Therefore, this exhaust gas mainly flows through the main passage 12m and reaches the catalyst 16. Therefore, the catalyst 16 is limited from becoming an oxidizing atmosphere and sintering is limited from occurring at the catalyst 16. On the other hand, at this time, the exhaust control valve 13 is controlled to the opened position, so the quantity of exhaust gas flowing through the HC adsorbent 14 is decreased and the quantity of HC desorbed from the HC adsorbent 14 and flowing into the catalyst 16 is decreased. As a result, the air-fuel ratio of the exhaust gas flowing into the catalyst 16 is limited from becoming an excessively rich air-fuel ratio and the quantity of HC exhausted from the catalyst 16 is limited from increasing.

Figure 3:
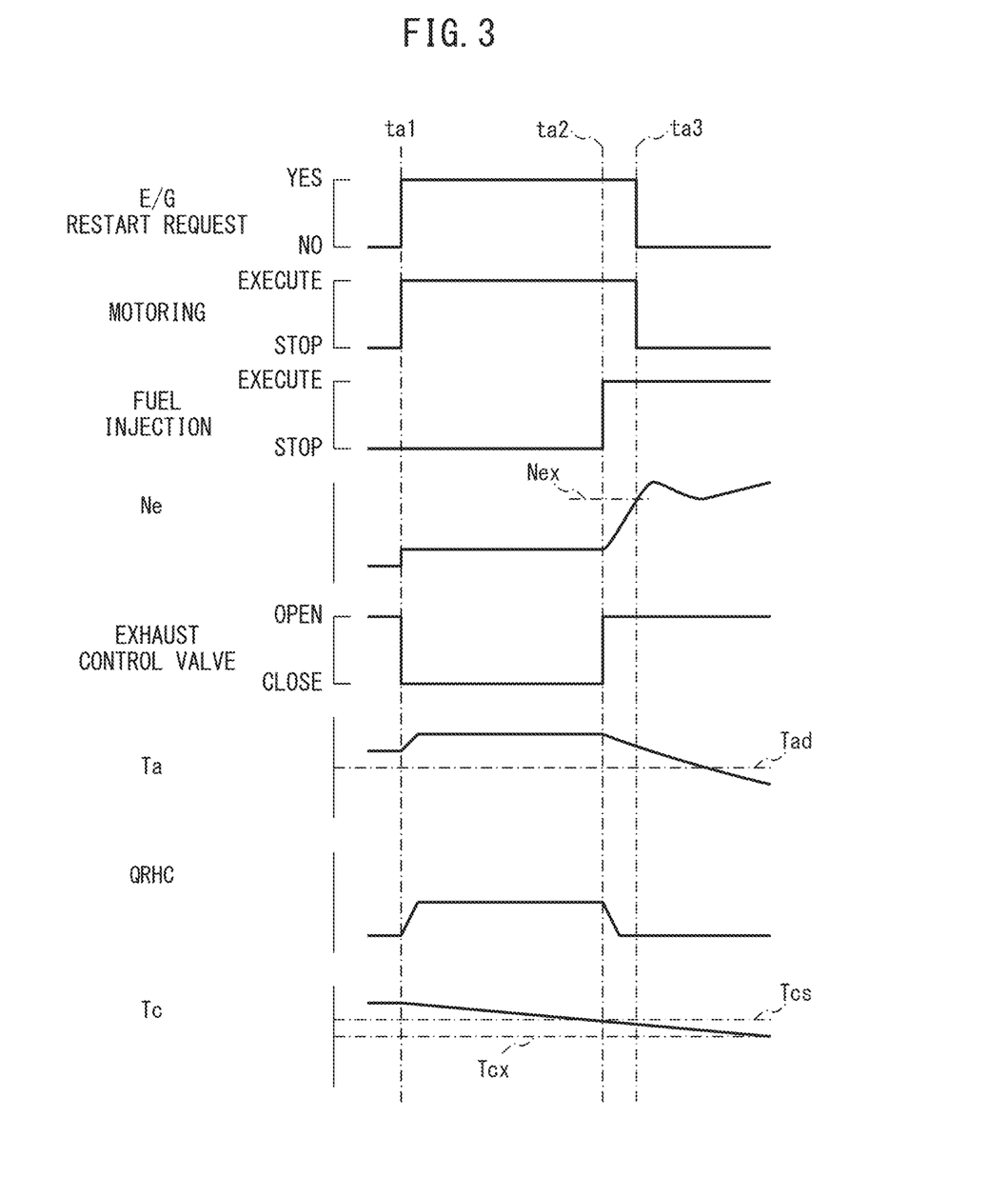
FIG. 3 is a time chart showing operation of an exhaust control valve etc. in an embodiment according to the present disclosure.

That is, as shown in FIG. 3, if, at the time ta1, a signal indicating a request for restart of the internal combustion engine (E/G) is issued, performing motoring, more accurately performing motoring without fuel injection, is initiated. In the example shown in FIG. 3, at this time, the temperature of the catalyst 16 Tc is higher than the set temperature Tcx, so the exhaust control valve 13 is controlled to the closed position. Note that, in FIG. 3, Tcs shows the sintering occurrence temperature of the catalyst 16.

Further, in the example shown in FIG. 3, at the time ta1, the temperature Ta of the HC adsorbent 14 is higher than the HC desorption temperature Tad of the HC adsorbent 14. Therefore, HC is desorbed from the HC adsorbent 14. That is, the quantity of HC desorbed from the HC adsorbent 14, that is, the quantity of HC flowing into the catalyst 16, QRHC, increases.

Next, at the time ta2, if the cylinder discrimination finishes, fuel injection is started while motoring is continued. Further, at this time, the exhaust control valve 13 is controlled to the opened position. As a result, exhaust gas mainly flows through the main passage 12m. For this reason, the quantity QRHC of HC desorbed from the HC adsorbent 14 is reduced. Note that, in an embodiment according to the present disclosure, the air-fuel ratio of the exhaust gas flowing through the exhaust pipe 3 at this time is the stoichiometric air-fuel ratio or rich air-fuel ratio. Therefore, sintering is limited from occurring at the catalyst 16.

When fuel injection is started, the engine rotational speed Ne rapidly rises. In an embodiment according to the present disclosure, next at the time ta3, if the engine rotational speed Ne rises above a set rotational speed Nex determined in advance, it is judged that engine startup is finished, and motoring is thus stopped.

In an embodiment according to the present disclosure, the HC supplied to the catalyst 16 for limiting sintering is the HC recovered from the exhaust gas and stored in the HC adsorbent 14 when the catalyst 16 is in the inactive state. That is, additional fuel is not required for limiting sintering. Therefore, in an embodiment according to the present disclosure, fuel is utilized more effectively.

Note that, in an embodiment according to the present disclosure, during engine operation after the engine startup is finished, the exhaust control valve 13 is controlled based on, for example, the state of the catalyst 16. In one example, the exhaust control valve 13 is controlled to the opened position when the catalyst 16 is in the activated state and is controlled to the closed position when the catalyst 16 is in the inactive state. Further, in an embodiment according to the present disclosure, while the engine is stopped, the exhaust control valve 13 is controlled to the open position.

Figure 4:
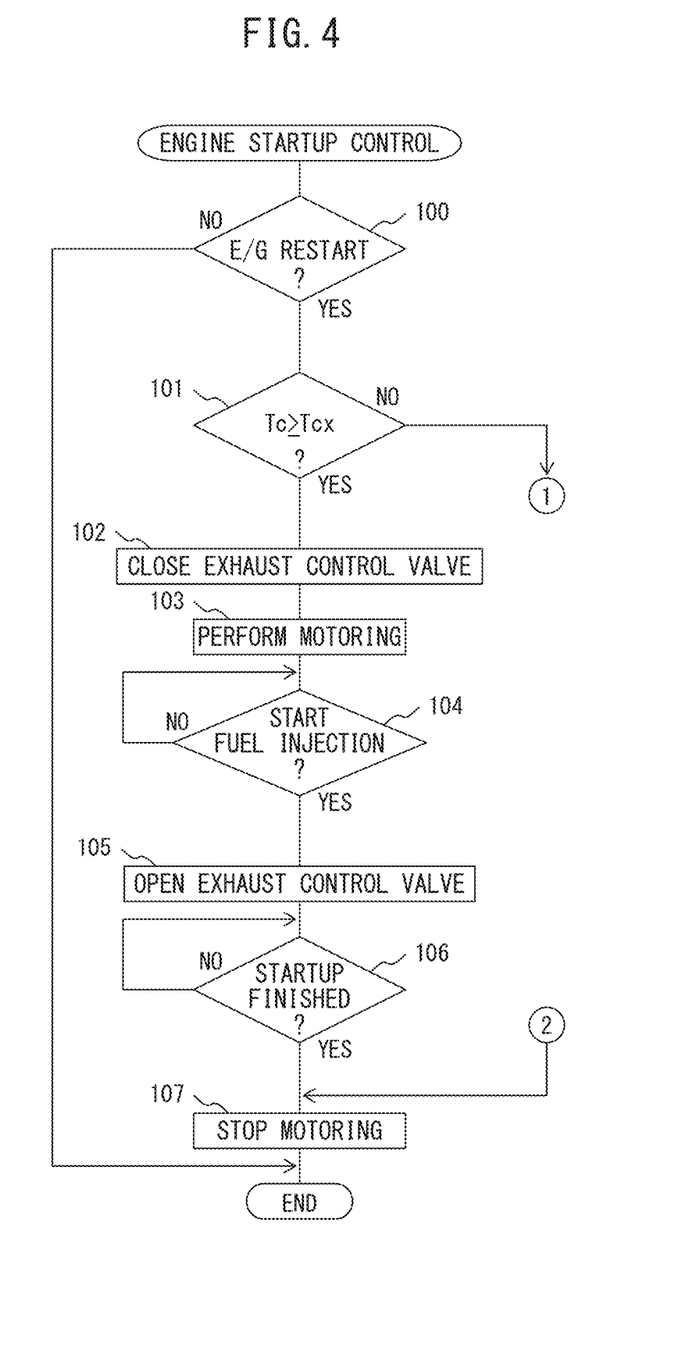
FIG. 4 is a flow chart for performing a routine for engine startup control in an embodiment according to the present disclosure.
Figure 5:
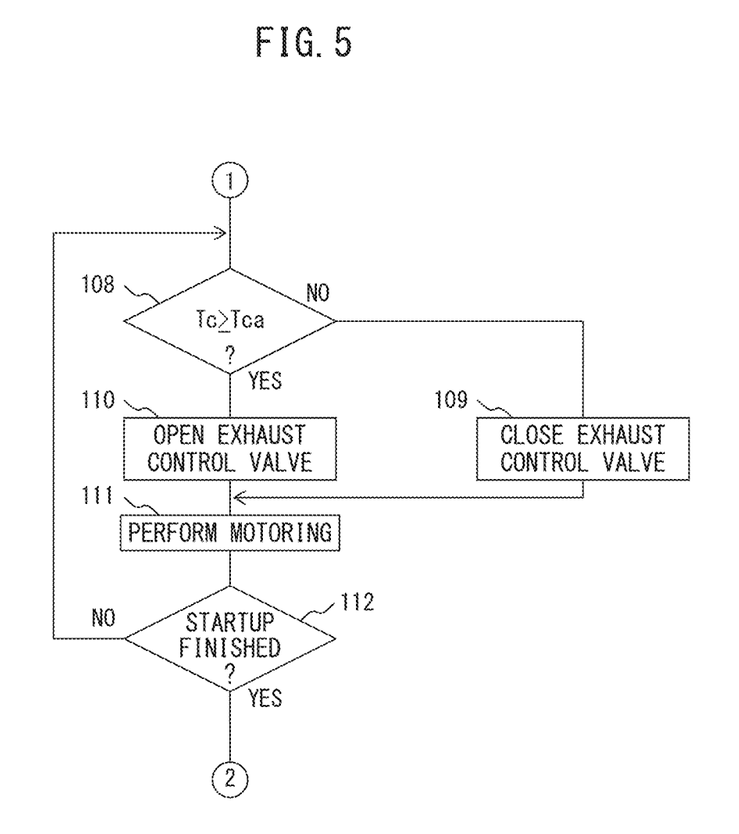
FIG. 5 is a flow chart for performing a routine for engine startup control in an embodiment according to the present disclosure.

FIG. 4 and FIG. 5 show a routine for control of engine startup of the above-mentioned embodiment according to the present disclosure. Referring to FIG. 4 and FIG. 5, at step 100, it is judged if the internal combustion engine should be restarted. When it is judged that the internal combustion engine should not be restarted, the processing cycle is ended. When it is judged that the internal combustion engine should be restarted, next the routine proceeds to step 101 where it is judged if the temperature Tc of the catalyst 16 is equal to or higher than the set temperature Tcx. When it is judged that Tc≥Tcx, next the routine proceeds to step 102 where the exhaust control valve 13 is controlled to the closed position. At the next step 103, motoring is performed. At the next step 104, it is judged if fuel injection has started. Step 104 is repeated until it is judged that fuel injection has started. If it is judged that fuel injection has started, the routine proceeds to step 105. At step 105, the exhaust control valve 13 is controlled to the opened position. At the next step 106, it is judged if the engine startup has finished. Step 106 is repeated until it is judged that the engine startup has finished. If it is judged that the engine startup has finished, the routine proceeds to step 107. At step 107, motoring is stopped.

When at step 101 it is judged that Tc<Tcx, next the routine proceeds to step 108 where it is judged if the temperature of the catalyst 16 is equal to or higher than the activation temperature Tca. When it is judged that Tc<Tca, next the routine proceeds to step 109 where the exhaust control valve 13 is controlled to the closed position. Next, the routine proceeds to step 111. As opposed to this, when it is judged that Tc≥Tca, next the routine proceeds to step 110 where the exhaust control valve 13 is controlled to the opened position. Next, the routine proceeds to step 111. At step 111, motoring is performed. At the next step 112, it is judged if the engine startup has finished. When the engine startup has not finished, the routine returns to step 108. If it is judged that the engine startup has finished, the routine proceeds to step 107 where motoring is stopped.

Therefore, in an embodiment according to the present disclosure, if it is judged that the temperature of the catalyst 16 is higher than the sintering occurrence temperature, the exhaust control valve 13 is controlled so that the quantity of HC desorbed from the HC adsorbent 14 is greater when performing motoring without fuel injection compared with when not performing motoring without fuel injection. Further, if it is judged that the temperature of the catalyst 16 is higher than the sintering occurrence temperature, the exhaust control valve is controlled so that the main passage 12m is closed when performing motoring without fuel injection and so that the main passage 12m is opened when not performing motoring without fuel injection.

Next, referring to FIG. 6, another embodiment according to the present disclosure will be explained. In the embodiment shown in FIG. 6, at the time tb1, a fuel cut operation is performed. At this time, the temperature Tc of the catalyst 16 is higher than the set temperature Tcx. If the exhaust control valve 13 is in the opened position at this time, the catalyst 16 may become hot and in an oxidizing atmosphere and sintering may occur at the catalyst 16. Therefore, in the embodiment shown in FIG. 6, the exhaust control valve 13 is controlled to the closed position. As a result, HC is desorbed from the HC adsorbent 14 and is fed to the catalyst 16. Therefore, sintering is limited from occurring at the catalyst 16. Note that, in the embodiment shown in FIG. 6, when the engine rotational speed is higher than a fuel cut execute rotational speed, a fuel cut operation is performed if the engine load becomes lower than a fuel cut execute load.

Next, if the engine load becomes higher than a fuel cut stop load or the engine rotational speed becomes lower than a fuel cut stop rotational speed, the fuel cut operation is stopped. If the fuel cut operation is performed, fuel injection is stopped. Next, at the time tb2, if the fuel cut operation is stopped, the exhaust control valve 13 is returned to the opened position.

Figure 6:
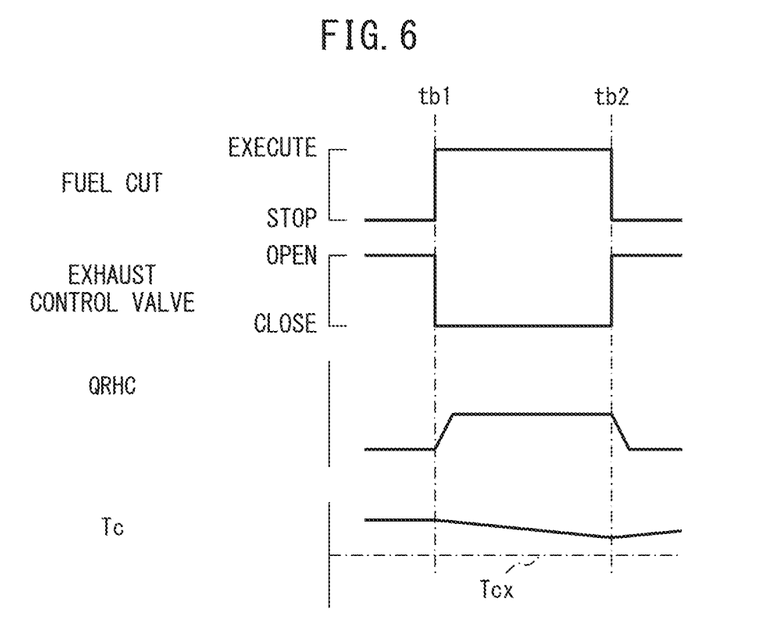
FIG. 6 is a time chart showing operation of an exhaust control valve etc. in another embodiment according to the present disclosure.

Therefore, in the embodiment shown in FIG. 6, when it is judged that the temperature of the catalyst 16 is higher than the sintering occurrence temperature, the exhaust control valve 13 is controlled so that the quality of HC desorbed from the HC adsorbent 14 is greater when performing a fuel cut operation compared to when not performing a fuel cut operation. Further, when it is judged that the temperature of the catalyst 16 is higher than the sintering occurrence temperature, the exhaust control valve 13 is controlled so that the main passage 12m is closed when performing a fuel cut operation and the main passage 12m is opened when not performing a fuel cut operation.

Next, referring to FIG. 7, a further other embodiment according to the present disclosure will be explained. In the embodiment shown in FIG. 7, at the time tc1, an inflowing exhaust air-fuel ratio AFexu, which is an air-fuel ratio of the exhaust gas flowing through the upstream exhaust passage portion (for example, the exhaust pipe 3, upstream space 10u, etc.), becomes larger than a set lean air-fuel ratio AFLx. At this time, the temperature Tc of the catalyst 16 is higher than the set temperature Tcx. At this time, if the exhaust control valve 13 is at the opened position, the catalyst 16 becomes hot and in the oxidizing atmosphere and the risk of sintering occurring at the catalyst 16 becomes higher. Therefore, in the embodiment shown in FIG. 7, the exhaust control valve 13 is controlled to a closed position. As a result, sintering is limited from occurring at the catalyst 16. Next, at the time tc2, if the inflowing exhaust air-fuel ratio AFexu becomes smaller than the set lean air-fuel ratio AFLx, the exhaust control valve 13 is returned to the opened position.

Figure 7:
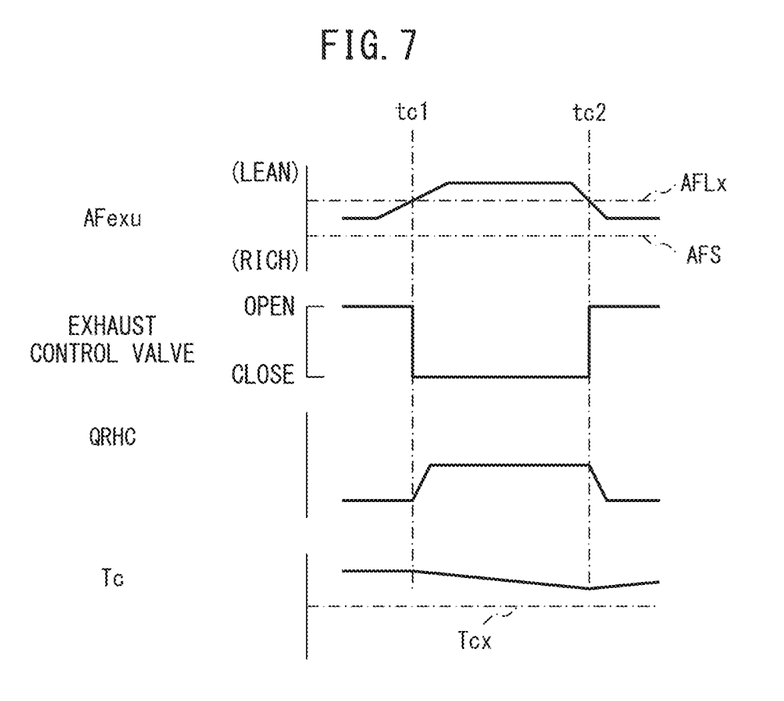
FIG. 7 is a time chart showing operation of an exhaust control valve etc. in still another embodiment according to the present disclosure.

Therefore, the embodiment shown in FIG. 7, when it is judged that the temperature of the catalyst 16 is higher than the sintering occurrence temperature, the exhaust control valve 13 is controlled so that the quantity of HC desorbed from the HC adsorbent 14 is greater when it is judged that the air-fuel ratio of the exhaust gas flowing through the upstream exhaust passage portion is greater than a predetermined, set lean air-fuel ratio compared to when it is judged that the air-fuel ratio of the exhaust gas flowing through the upstream exhaust passage portion is smaller than the set lean air-fuel ratio. Further, when it is judged that the temperature of the catalyst 16 is higher than the sintering occurrence temperature, the exhaust control valve is controlled so that the main passage 12m is closed when it is judged that the air-fuel ratio of the exhaust gas flowing through the upstream exhaust passage portion is larger than a predetermined, set lean air-fuel ratio and so that the main passage 12m is opened when it is judged that the air-fuel ratio of the exhaust gas flowing through the upstream exhaust passage portion is smaller than the set lean air-fuel ratio.

In the embodiments explained up to now, the exhaust control valve 13 is controlled to the opened position or closed position. As opposed to this, in another embodiment (not shown), the exhaust control valve 13 is controlled to an intermediate position between the opened position and the closed position. In this case, if the opening degree position of the exhaust control valve 13 is controlled to approach the closed position, the quantity of exhaust gas flowing through the HC adsorbent 14 is increased and the quantity of HC desorbed from the HC adsorbent 14 and fed to the catalyst 16 is increased. Therefore, for example, at the time of performing motoring without fuel injection, the exhaust control valve 13 is controlled to approach the closed position, while at the time of not performing motoring without fuel injection, the exhaust control valve 13 is controlled to approach the opened position.

Therefore, if expressing comprehensively the various embodiments explained up to there, the exhaust control valve 13 is controlled, when it is judged that the temperature of the catalyst 16 is higher than a sintering occurrence temperature determined in advance, so that the quantity of HC desorbed from the HC adsorbent is greater when it is judged that the air-fuel ratio of the exhaust gas flowing through the upstream exhaust passage portion is a lean air-fuel ratio compared with when it is judged that the air-fuel ratio of the exhaust gas flowing through the upstream exhaust passage portion is a stoichiometric air-fuel ratio or rich air-fuel ratio, or so that the quantity of HC desorbed from the HC adsorbent is greater when it is judged that the air-fuel ratio of the exhaust gas flowing through the upstream exhaust passage portion is a larger lean air-fuel ratio compared with when it is judged that the air-fuel ratio of the exhaust gas flowing through the upstream exhaust passage portion is a smaller lean air-fuel ratio.

Figure 8:
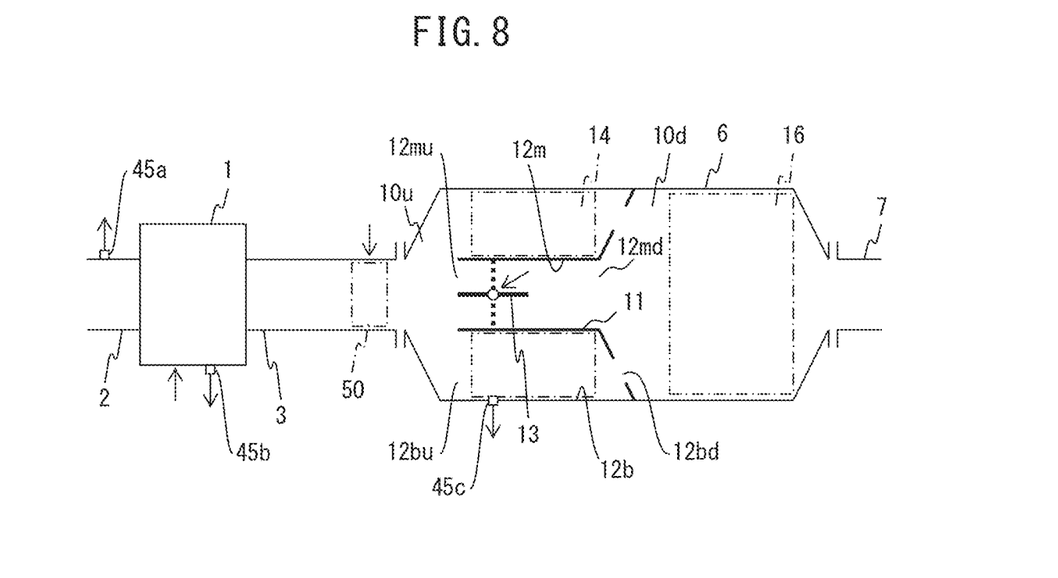
FIG. 8 is a schematic overall view of an internal combustion engine in still another embodiment according to the present disclosure.

FIG. 8 shows a further other embodiment according to the present disclosure. The embodiment shown in FIG. 8 differs in constitution from the above embodiments on the point of provision of an electric heater 50 for directly or indirectly heating the HC adsorbent 14. In particular, the electric heater 50 of the embodiment shown in FIG. 8 is comprised of an electric heater arranged inside the exhaust pipe 3 for heating the exhaust gas flowing through the exhaust pipe 3. If the exhaust gas heated by the electric heater 50 flows through the HC adsorbent 14, the HC adsorbent 14 is heated by this exhaust gas. In another embodiment (not shown), the electric heater is arranged inside the upstream space 10u or inside the bypass passage 12b upstream of the HC adsorbent 14. In a still other embodiment (not shown), the electric heater is provided in the HC adsorbent 14 so as to directly heat the HC adsorbent 14.

As explained above, it is considered that, when it is judged that the temperature of the catalyst 16 is higher than the sintering occurrence temperature, the temperature of the upstream exhaust member (for example, exhaust pipe 3, casing 6, etc.) is also high. In this case, it is considered that the exhaust gas is heated by the upstream exhaust member, then flows into the HC adsorbent 14 to heat the HC adsorbent 14, and therefore, the temperature of the HC adsorbent 14 is maintained equal to or higher than the HC desorption temperature.

However, in some cases, even if the temperature of the catalyst 16 is high, the temperature of the upstream exhaust member is low. In this case, when the exhaust control valve 13 is controlled to a closed position, HC may not be sufficiently desorbed from the HC adsorbent 14. In this case, even if the exhaust control valve 13 is controlled to the closed position, sintering may not be limited from occurring at the catalyst 16.

Therefore, in the embodiment shown in FIG. 8, when it is judged that the temperature of the catalyst 16 is higher than the sintering occurrence temperature and the exhaust control valve 13 is controlled to the closed position, the electric heater 50 is actuated when it is judged that the temperature of the upstream exhaust member is lower than a predetermined, threshold value. As a result, the temperature of the HC adsorbent 14 is reliably maintained equal to or higher than the HC desorption temperature. Therefore, sintering is reliably limited from occurring at the catalyst 16. As opposed to this, when it is judged that the temperature of the upstream exhaust member is higher than the threshold value, the electric heater 50 is turned off. In this case, it is believed that the temperature of the HC adsorbent 14 becomes equal to or higher than the HC desorption temperature, and thus there is no need to actuate the electric heater 50.

In the embodiment shown in FIG. 8, it is judged if the temperature of the upstream exhaust member is lower than the threshold value based on, for example, the elapsed time from when engine operation was stopped, the engine cooling water temperature, the air temperature, etc. or based on the temperature of the upstream exhaust member detected by a temperature sensor.

Figure 9:
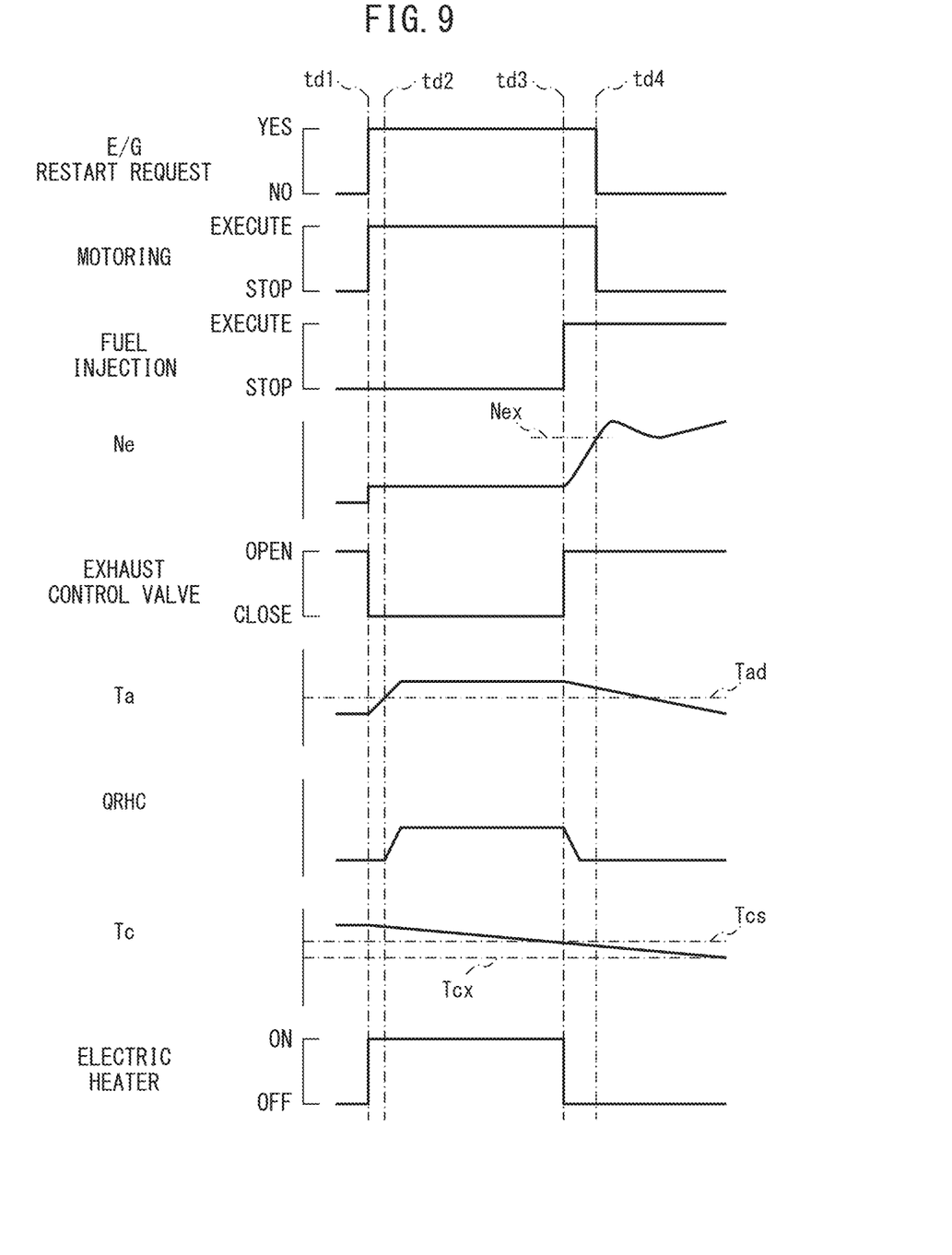
FIG. 9 is a time chart showing operation of an exhaust control valve etc. in the embodiment shown in FIG. 8.

That is, in the embodiment shown in FIG. 8, as shown in FIG. 9, at the time td1, if a signal indicating a request for restart of the internal combustion engine (E/G) is issued, motoring without fuel injection is started. In the example shown in FIG. 9, at this time, the temperature Tc of the catalyst 16 is higher than the set temperature Tcx, so the exhaust control valve 13 is controlled to the closed position.

In the embodiment shown in FIG. 9, at the time td1, it is judged that the temperature of the upstream exhaust member is lower than a threshold value. Therefore, at this time, the electric heater 50 is actuated. Note that, in the example shown in FIG. 9, at the time td1, the temperature Ta of the HC adsorbent 14 is lower than the HC desorption temperature Tad, so the quantity QRHC of HC desorbed from the HC adsorbent 14 does not immediately increase.

Next, at the time td2, if the temperature Ta of the HC adsorbent 14 rises over the HC desorption temperature Tad, HC starts to be desorbed from the HC adsorbent 14 and the quantity QRHC of HC desorbed from the HC adsorbent 14 starts to increase.

Next, at the time td3, if cylinder discrimination is ended, fuel injection is started while motoring is continued. Further, at this time, the exhaust control valve 13 is controlled to the opened position and the electric heater 50 is stopped. Next, at the time td4, if the engine rotational speed Ne rises over the predetermined, set rotational speed Nex, motoring is stopped.

Figure 10:
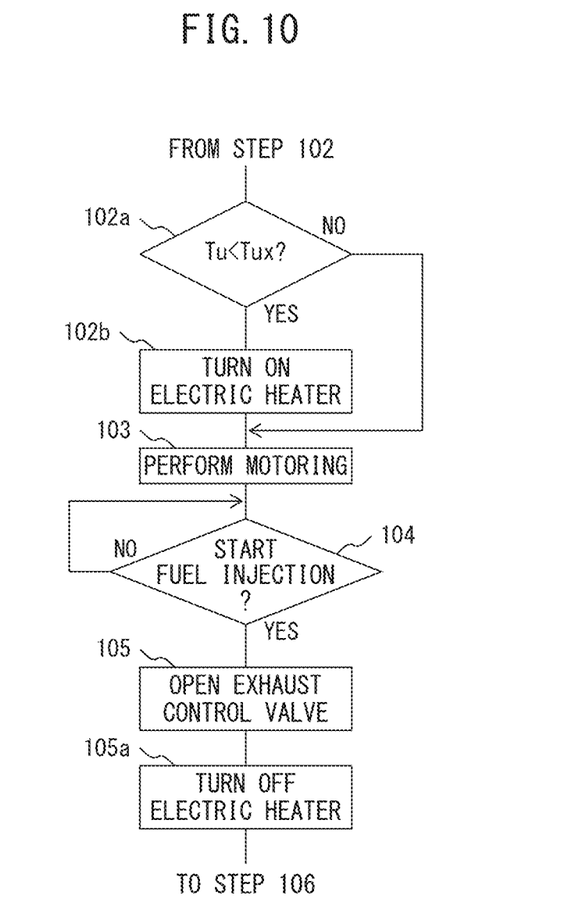
FIG. 10 is a flow chart for performing a routine for engine startup control in the embodiment shown in FIG. 8.

FIG. 10 shows part of the routine for control of engine startup of the embodiment shown in FIG. 8. That is, in the embodiment shown in FIG. 8, part of the routine shown in FIG. 4 and FIG. 5 is replaced with the routine of FIG. 10. Explained specifically, in the embodiment shown in FIG. 10, the routine proceeds from step 102 of FIG. 4 to step 102a of FIG. 10 where it is judged if the temperature Tu of the upstream exhaust member is lower than the threshold value Tux. When it is judged that Tu<Tux, next the routine proceeds to step 102b where the electric heater 50 is actuated. Next, the routine proceeds to step 103. As opposed to this, when it is judged that Tu≥Tux, the routine proceeds to step 103 while maintaining the electric heater 50 stop. At step 103, motoring is performed. At the next step 104, it is judged whether fuel injection has started. Step 104 is repeated until it is judged that fuel injection has started. If it is judged that fuel injection has started, the routine proceeds to step 105. At step 105, the exhaust control valve 13 is controlled to the opened position. At the next step 105a, the electric heater 50 is stopped. Next, the routine proceeds to step 106.

In a further other embodiment according to the present disclosure, at least two embodiments explained above are combined with each other.

This application claims the benefit of JP Application No. 2020-054648, the entire disclosure of which is incorporated by reference herein.

The invention claimed is:

1. A control device for an internal combustion engine, comprising:
   an exhaust passage provided with:
      an upstream exhaust passage portion connected with an engine body;
      a downstream exhaust passage portion; and
      a main exhaust passage portion and bypass exhaust passage portion extending alongside each other between the upstream exhaust passage portion and the downstream exhaust passage portion;
   a catalyst arranged in the downstream exhaust passage portion;
   an exhaust control valve distributing exhaust gas flowed through the upstream exhaust passage portion to the main exhaust passage portion or the bypass exhaust passage portion to control a main exhaust gas quantity which is an amount of exhaust gas flowing through the main exhaust passage portion and a bypass exhaust gas quantity which is an amount of exhaust gas flowing through the bypass exhaust passage portion;
   a hydrocarbon (HC) adsorbent arranged in the bypass exhaust passage portion and configured to adsorb HC in the exhaust gas; and
   an electronic control unit configured to, when it is judged that the temperature of the catalyst is higher than a sintering occurrence temperature determined in advance,
      control the exhaust control valve to increase the bypass exhaust gas quantity and the quantity of HC desorbed from the HC adsorbent when it is judged that an air-fuel ratio of the exhaust gas flowing through the upstream exhaust passage portion is a lean air-fuel ratio compared to when it is judged that the air-fuel ratio of the exhaust gas flowing through the upstream exhaust passage portion is a stoichiometric air-fuel ratio or rich air-fuel ratio, or
      control the exhaust control valve to increase the bypass exhaust gas quantity and the quantity of HC desorbed from the HC adsorbent when it is judged that the air-fuel ratio of the exhaust gas flowing through the upstream exhaust passage portion is a larger lean air-fuel ratio compared to when it is judged that the air-fuel ratio of the exhaust gas flowing through the upstream exhaust passage portion is a smaller lean air-fuel ratio,
   wherein
   the sintering occurrence temperature of the catalyst is higher than an activated temperature of the catalyst, and
   the electronic control unit is further configured to, when the temperature of the catalyst is judged to be lower than the sintering occurrence temperature of the catalyst,
      open the exhaust control valve in response to the temperature of the catalyst being judged to be higher than the activation temperature of the catalyst, and
      close the exhaust control valve in response to the temperature of the catalyst being judged to be lower than the activation temperature of the catalyst.

2. The control device according to claim 1, wherein the electronic control unit is configured to, when it is judged that the temperature of the catalyst is higher than the sintering occurrence temperature, control the exhaust control valve to increase the bypass exhaust gas quantity and the quantity of HC desorbed from the HC adsorbent when motoring without fuel injection is performed compared with when motoring without fuel injection is not performed.

3. The control device according to claim 1, wherein the electronic control unit is configured to, when it is judged that the temperature of the catalyst is higher than the sintering occurrence temperature,
control the exhaust control valve to close the main exhaust passage portion when motoring without fuel injection is not performed, and
control the exhaust control valve to open the main exhaust passage portion when motoring without fuel injection is not performed.

4. The control device according to claim 1, wherein the electronic control unit is configured to, when it is judged that the temperature of the catalyst is higher than the sintering occurrence temperature,
control the exhaust control valve to increase the bypass exhaust gas quantity and the quantity of HC desorbed from the HC adsorbent when a fuel cut operation is performed compared with when a fuel cut operation is not performed.

5. The control device according to claim 1, wherein the electronic control unit is configured to, when it is judged that the temperature of the catalyst is higher than the sintering occurrence temperature,
control the exhaust control valve to close the main exhaust passage portion when a fuel cut operation is performed, and
control the exhaust control valve to open the main exhaust passage portion when a fuel cut operation is not performed.

6. The control device according to claim 1, wherein the electronic control unit is configured to, when it is judged that the temperature of the catalyst is higher than the sintering occurrence temperature,
control the exhaust control valve to increase the bypass exhaust gas quantity and the quantity of HC desorbed from the HC adsorbent when it is judged that the air-fuel ratio of the exhaust gas flowing through the upstream exhaust passage portion is larger than a set lean air-fuel ratio determined in advance compared with when the air-fuel ratio of the exhaust gas flowing through the upstream exhaust passage portion is smaller than the set lean air-fuel ratio.

7. The control device according to claim 1, wherein the electronic control unit is configured to, when it is judged that the temperature of the catalyst is higher than the sintering occurrence temperature,
control the exhaust control valve to close the main exhaust passage portion when it is judged that the air-fuel ratio of the exhaust gas flowing through the upstream exhaust passage portion is larger than a set lean air-fuel ratio determined in advance, and
control the exhaust control valve to open the main exhaust passage portion when it is judged that the air-fuel ratio of the exhaust gas flowing through the upstream exhaust passage portion is smaller than the set lean air-fuel ratio.

8. The control device according to claim 1, further comprising an electric heater configured to directly or indirectly heat the HC adsorbent,
wherein the electronic control unit is configured to, when it is judged that the temperature of the catalyst is higher than the sintering occurrence temperature and the exhaust control valve is controlled to close the main exhaust passage portion,
actuate the electric heater in response to the temperature of an upstream exhaust member, which forms the upstream exhaust passage portion, being lower than a predetermined threshold value.

* * * * *